(12) United States Patent
Syed et al.

(10) Patent No.: US 9,656,556 B2
(45) Date of Patent: May 23, 2017

(54) CAPACITOR DISCHARGING DURING DEACTIVATION OF ELECTRIC VEHICLE DRIVE SYSTEM

(71) Applicant: FORD GLOBAL TECHNOLOGIES, LLC, Dearborn, MI (US)

(72) Inventors: Fazal U. Syed, Canton, MI (US); Siwei Cheng, Canton, MI (US); Daniel R. Luedtke, Beverly Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 262 days.

(21) Appl. No.: 14/160,759

(22) Filed: Jan. 22, 2014

(65) Prior Publication Data

US 2015/0202967 A1    Jul. 23, 2015

(51) Int. Cl.
| H02J 7/00 | (2006.01) |
| B60L 11/00 | (2006.01) |
| B60L 3/04 | (2006.01) |

(52) U.S. Cl.
CPC ............... B60L 11/005 (2013.01); B60L 3/04 (2013.01)

(58) Field of Classification Search
CPC .................................................... H02J 7/0052
USPC ........................................................ 320/166
See application file for complete search history.

(56) References Cited

U.S. PATENT DOCUMENTS

| 8,441,224 | B2 * | 5/2013 | Sumi | B60L 3/04 |
| | | | | 180/65.265 |
| 8,786,238 | B2 * | 7/2014 | Oyobe | H02P 3/22 |
| | | | | 307/10.1 |
| 2011/0221370 | A1 * | 9/2011 | Fukuta | H02M 1/32 |
| | | | | 318/400.27 |
| 2012/0013182 | A1 * | 1/2012 | Minegishi | B60K 6/365 |
| | | | | 307/9.1 |
| 2012/0039100 | A1 * | 2/2012 | Hirose | B60K 6/445 |
| | | | | 363/50 |
| 2012/0212160 | A1 * | 8/2012 | Shindo | B60L 3/0007 |
| | | | | 318/139 |
| 2012/0309588 | A1 * | 12/2012 | Ashida | B60L 3/04 |
| | | | | 477/7 |
| 2013/0015802 | A1 * | 1/2013 | Hirose | B60L 3/00 |
| | | | | 318/488 |
| 2013/0204477 | A1 * | 8/2013 | Sakata | B60L 3/0015 |
| | | | | 701/22 |
| 2014/0095005 | A1 * | 4/2014 | Kanzaki | B60L 11/1803 |
| | | | | 701/22 |

(Continued)

*Primary Examiner* — Drew A Dunn
*Assistant Examiner* — Harry O'Neill-Becerril
(74) *Attorney, Agent, or Firm* — David B. Kelley; MacMillan, Sobanski & Todd, LLC

(57) ABSTRACT

A drive system for an electric vehicle includes an input capacitor selectably coupled to a DC power source (e.g., battery) by a contactor. A variable voltage converter couples the input capacitor to a main link capacitor, and an inverter couples the main capacitor to a machine load (e.g., motor and/or generator). During a normal or emergency shutdown, the contactor is opened. In order to quickly discharge the input capacitor when the contactor opens, A) the converter operates in a boost mode to transfer charge from the input capacitor to the main capacitor until the input capacitor discharges to less than a threshold voltage, B) the converter deactivates to prevent transferring charge from the main capacitor to the input capacitor, and C) the main capacitor can then be discharged through the inverter.

14 Claims, 3 Drawing Sheets

(56) References Cited

U.S. PATENT DOCUMENTS

2015/0326156 A1* 11/2015 Kanzaki .................. H02M 1/32
318/400.21

* cited by examiner

_US 9,656,556 B2_

CAPACITOR DISCHARGING DURING DEACTIVATION OF ELECTRIC VEHICLE DRIVE SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to drive systems for electric vehicles, and, more specifically, to the rapid discharging of capacitors when shutting down the electric drive system.

Electric vehicles, such as hybrid electric vehicles (HEVs) and plug-in hybrid electric vehicles (PHEVs), use inverter-driven electric machines to provide traction torque and regenerative braking torque. Such inverters typically employ an energy storage capacitor (or the main capacitor) as the DC link, which is usually interfaced with the high-voltage (HV) battery through a variable voltage converter (VVC), an input capacitor, and a pair of mechanical contactors (collectively forming a drive system).

A shutdown of the drive system can result from a vehicle key-off, a high-voltage DC interlock fault, or a vehicle crash, for example. During shutdown, the HV battery is quickly isolated from the rest of the electric system by opening the mechanical contractors. However, there will still be HV electric charge on the input capacitor and the main capacitor. Due to safety requirements, those HV electric charges should be quickly discharged within a specific time.

One conventional discharging method operates as follows. Once the open state of the contactor is confirmed, upper and lower switches (e.g., IGBTs) of the VVC are disabled. The inverter switches the main capacitor voltage into the machine load (which may be the motor or the generator) in order to dissipate the electric charge on the main capacitor by pushing a calibratable flux-weakening current into the motor and/or the generator. The flux-weakening current includes a negative D-axis current component and a zero Q-axis current component which is preferably controlled to produce zero torque in the machine.

As a result of the current flowing through the inverter to the machine, the energy stored in the main capacitor is converted into losses in the machine windings and the IGBT switches. Consequently, the voltage on the main capacitor starts to drop. Once the voltage on the main capacitor drops below that of the input capacitor, the reverse-blocking diode of the upper-leg IGBT in the VVC begins to conduct, forcing the voltage on both capacitors to be approximately the same. The flux-weakening current begins to discharge both the main capacitor and the input capacitor simultaneously. Once the main capacitor voltage and the input capacitor voltage drop below a voltage threshold, the main capacitor voltage can be maintained at this level through active bus voltage regulation—which may be desirable when the shutdown occurs while the motor or generator are rotating in order to allow a controlled ramping down of the rotation. Then once the motor and generator speed drops below a speed threshold, the inverter continues to operate so that the discharge current ramps down to zero, whereupon the inverter IGBTs are turned off and the discharge is completed.

Although the conventional method works adequately in many circumstances, it has some limitations. Ideally, if the motor/generator inverters are pushing flux-weakening currents into the motor and the generator, the voltage on the main capacitor should go down. Because of possible inaccuracies in the position signals for the machines, however, a negative Q-axis current may be injected into the machines so that a regenerative torque may be produced. In such cases, the voltage on the main capacitor may go up instead of going down. This effect is more likely to happen when the motor or generator speed is high. Thus, the robustness of the conventional discharge strategy against position sensor inaccuracy may be less than desired.

In the conventional method, the discharge of the input capacitor stops when the voltage reaches a predetermined level. The value for this level is typically low enough to ensure safety to human beings, but it must also be chosen to be high enough to maintain stable current control of the permanent magnet machines within a certain speed range (which is necessary due to the position sensor inaccuracy noted above). If the motor and generator speed is above this speed range, stable current control may not be available at a safe level of the DC bus voltage. Thus, the operating conditions where the conventional discharge strategy is fully functional are limited.

In addition, it would be desirable to decrease the time required to discharge the capacitors. Typically the main capacitor has a much larger capacitance than the input capacitor and usually operates with a much higher voltage. Discharging the main capacitor first to the voltage level of the input capacitor and then further discharging the two capacitors together significantly limits the discharge speed for the input capacitor, even though the reduction of the input capacitor voltage may be more important for human safety concerns.

SUMMARY OF THE INVENTION

To address these foregoing problems, the present invention employs a discharge strategy capable of dissipating the energy on the input capacitor and isolating the main capacitor within an extremely short period of time at any operating condition of the drive system.

In one aspect of the invention, a drive system for an electric vehicle comprises an input capacitor, a contactor with an open state and a closed state for selectably coupling the input capacitor to a DC power source, and a main capacitor. A variable voltage converter couples the input capacitor to the main capacitor and comprises a plurality of converter switches adapted for boost conversion. An inverter couples the main capacitor to a machine load and comprises a plurality of inverter switching devices in a bridge configuration. A controller is coupled to the converter and the inverter to discharge the input capacitor and the main capacitor when the contactor goes from the closed state to the open state by A) operating the converter in the boost mode to transfer charge from the input capacitor to the main capacitor until the input capacitor discharges to less than a threshold voltage, B) deactivating the converter switches to prevent transferring charge from the main capacitor to the input capacitor, and C) discharging the main capacitor through the inverter switches.

DETAILED DESCRIPTION OF PREFERRED EMBODIMENTS

The invention utilizes a high-performance discharge strategy that follows an "input capacitor first, main capacitor second" approach. In general, the invention confirms that the battery contactor is open, and then places the VVC in a boost mode (e.g., with the VVC IGBTs switching normally). As a result of the VVC boost operation, most energy stored in the input capacitor is pumped into the main capacitor. Since the main linking capacitor is not discharged first, the input capacitor is discharged to a very low voltage very quickly regardless of the motor/generator speed. In particular, the overall discharge time for the input capacitor can be improved by two orders of magnitude.

Figure 1:
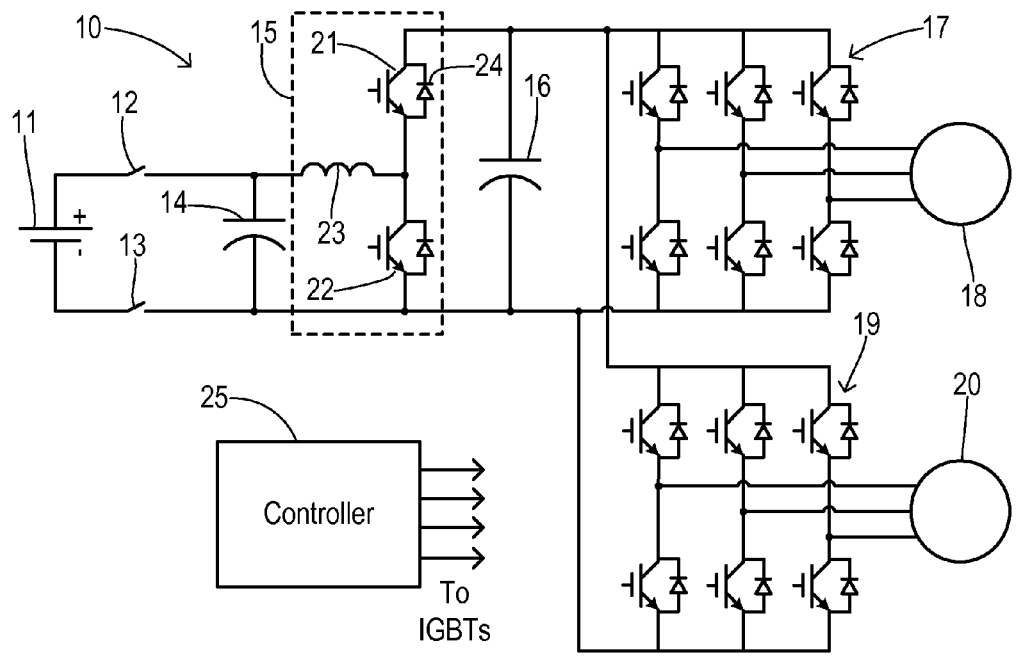
FIG. 1 is a schematic diagram showing one preferred embodiment of the invention.

Referring now to FIG. 1, an electric vehicle drive system 10 includes a DC power source 11 (such as a battery pack or a fuel cell) coupled by contactor switches 12 and 13 to an input capacitor 14. Contactors 12 and 13 are preferably mechanical switches having an open state and a closed state for selectively coupling battery 11 to input capacitor 14 according to a driving mode of drive system 10.

A variable voltage converter (VVC) 15 couples input capacitor 14 to a main capacitor 16 which functions as a linking capacitor for converters 17 and 19, for example. Each inverter includes a plurality of switching devices in a bridge configuration. The switches in inverter 17 are switched in a desired manner to drive a motor 18. Inverter 19 is switched to regenerate energy from a generator 20 onto main capacitor 16.

VVC 15 has a known configuration including an upper converter switch 21 and a lower converter switch 22, with a junction between switches 21 and 22 coupled to input capacitor 14 by an inductor 23. VVC 15 can bilaterally transfer charge between capacitors 14 and 16 as known in the art in either a boost mode (e.g., converting the battery voltage on input capacitor 14 to a higher voltage across capacitor 16 for purposes of driving motor 18) or a buck mode (e.g., to convert a voltage from generator 20 and inverter 19 to a voltage for recharging battery 11).

Each of the switching devices in VVC 15 and inverters 17 and 19 are preferably comprised of an insulated-gate bipolar transistor (IGBT). Each IGBT includes a reverse-blocking diode such as diode 24 in upper converter switch 21. Each IGBT has a respective control (e.g., base) terminal coupled to a controller 25 which controls the switches according to various operating modes of the converter and inverters. In the conventional ("main capacitor first") discharging method, it was diode 24 that would conduct current once main capacitor 16 was discharged to a voltage less than the voltage on input capacitor 14, thereby resulting in a discharging of input capacitor 14 no faster than main capacitor 16. In contrast, the present invention starts the discharge process by operating converter 15 in a boost conversion mode thereby allowing input capacitor 14 to quickly transition to a voltage lower than the voltage across main capacitor 16. In particular, controller 25 is configured to operate converter 15 and one or both of inverters 17 and 19 in a manner to discharge the input capacitor and the main capacitor when the contactor goes from the closed state to the open state by A) operating the converter in the boost mode to transfer charge from the input capacitor to the main capacitor until the input capacitor discharges to less than a threshold voltage, and B) deactivating the converter switches to prevent transferring charge from the main capacitor to the input capacitor. In addition, controller 25 operates to C) discharge the main capacitor through the inverter switches (either immediately or after the discharging of the input capacitor). In any case, the input capacitor is discharged in as little as 2 milliseconds instead of the 200 milliseconds of the conventional method. Thereafter, the inverter(s) can discharge the main capacitor using any desired method.

Figure 2:
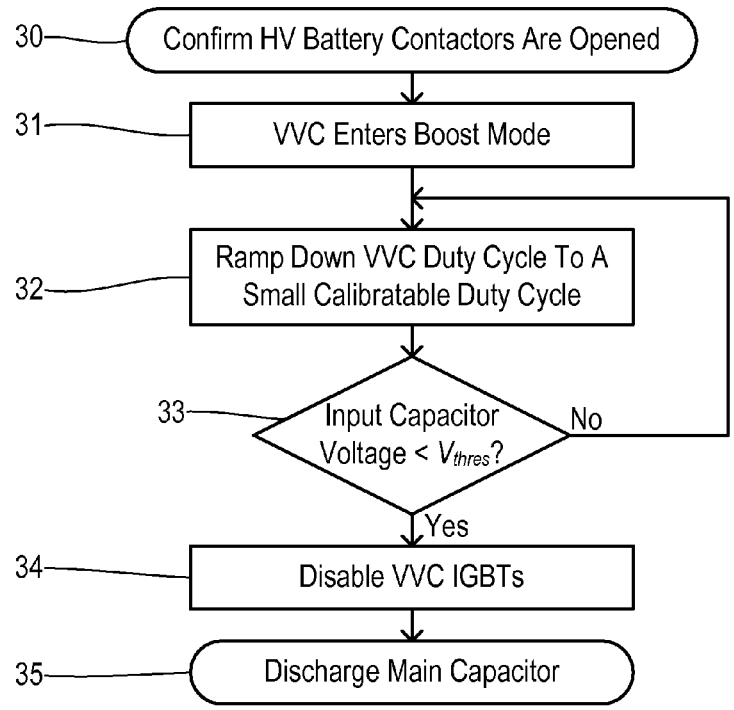
FIG. 2 is a flowchart showing one preferred method of the invention.

In a first preferred method shown in FIG. 2, the invention confirms that the high-voltage battery contactor(s) is/are open in step 30. In step 31, the converter enters the boost mode, thereby beginning to transfer charge from the input capacitor to the main capacitor and reducing the voltage across the input capacitor. While in the boost mode, the present invention may preferably ramp down the converter duty cycle to a small (calibratable) duty cycle as shown in step 32. In this embodiment, the duty cycle determines the voltage ratio between the input capacitor and the main capacitor, and the act of ramping down the duty cycle lowers the input capacitor voltage. A check is made in step 33 to determine whether the input capacitor voltage has discharged to less than a threshold voltage, $V_{thres}$. If not, then a return is made to step 32 to continue to ramp down the duty cycle. Once the input capacitor voltage is less than the threshold voltage, the converter switches are disabled in step 34. By deactivating the converter, the transfer of charge from the main capacitor back to the input capacitor is prevented. With the input capacitor discharged, the main capacitor is discharged in step 35. Although not shown in FIG. 2, the discharging of the main capacitor in step 35 can be initiated simultaneously with step 31, if desired.

When in the input capacitor dumps its electric charge onto the main capacitor through the converter boost operation, switching losses present in the converter and the relatively larger capacitance of the main capacitor will usually ensure that there will not be any significant voltage overshoot on the main capacitor as a result of the charge received from the input capacitor. However, if the main capacitor voltage is already near an upper limit before the discharge starts, there may be a need to further suppress any potential voltage overshoot on the main capacitor while the converter is boosting. To prevent the overshoot, one or more of the machine loads (i.e., the motor or generator) can be operated in an active bus-voltage regulation mode wherein the main capacitor voltage is actively regulated to follow a commanded value.

Figure 3:
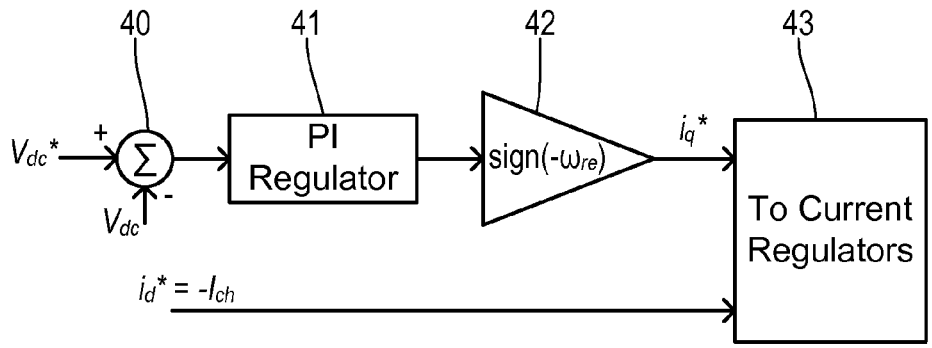
FIG. 3 is a block diagram of an active bus-voltage regulation mode useful during discharging of the input capacitor.

An implementation of active bus-voltage regulation is shown in FIG. 3. The main capacitor voltage $V_{dc}$ is compared to a commanded voltage (upper voltage limit) $V_{dc}^*$ in a summer 40 which provides a difference signal to a proportional-integral (PI) regulator 41. The output of regulator 41 is coupled to the input of an amplifier 42 to generate a Q-axis current command $i_q^*$. Amplifier 42 has a gain corresponding to the signed speed $\omega_{re}$ of the motor or generator. A D-axis current command ID* is set to a characteristic short circuit current of the machine $-I_{ch}$. The Q-axis and D-axis current commands are applied to current regulators 43, so that an appropriate level of current is dissipated into the machine load in order to maintain the main capacitor voltage at less than the limit.

Figure 4:
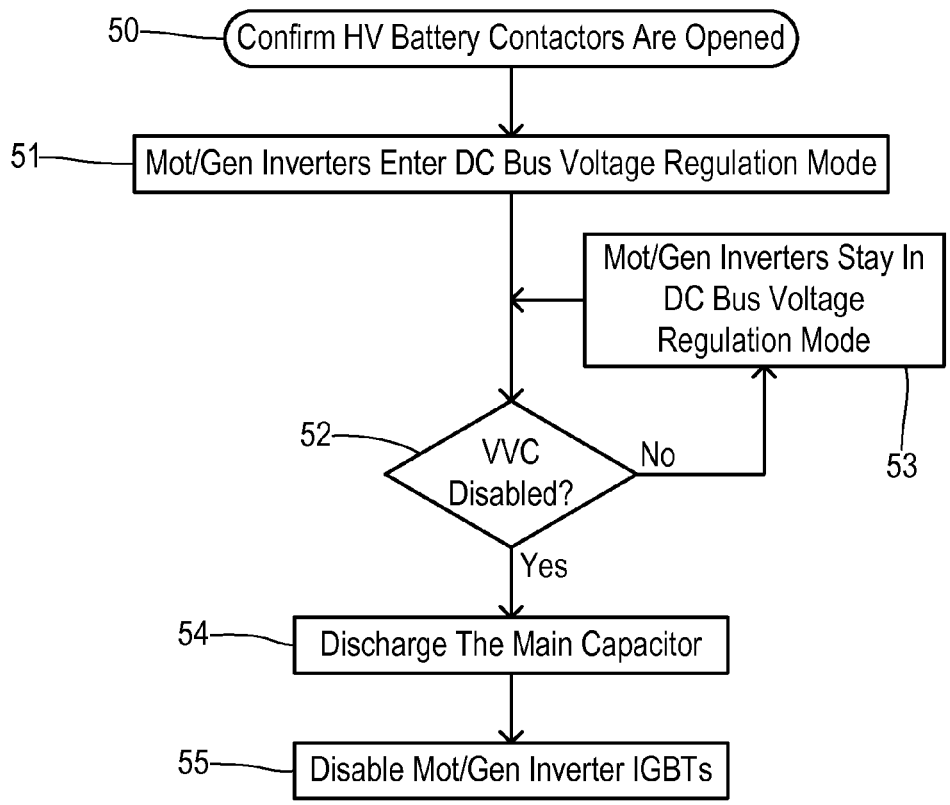
FIG. 4 is a flowchart of a method using the regulation mode of FIG. 3.

A method incorporating the voltage regulation of FIG. 3 is shown in FIG. 4. In step 50, an opened state of the high-voltage battery contactor(s) is/are confirmed (e.g., resulting from a key-off command or the detection of an emergency shutdown condition such as a collision). The variable voltage converter begins to operate in the boost mode to discharge the input capacitor into the main capacitor and the motor or generator inverters enter the bus-voltage regulation mode in step 51. A check is performed in step 52 to determine whether the converter has been disabled after discharging the input capacitor (e.g., using the method shown in FIG. 2). If not yet disabled, then the inverters stay in the bus-voltage regulation mode in step 53. Once disabling of the converter is detected in step 52, then the discharge of the main capacitor begins (or continues) in step 54. Once rotation speed of the machine load(s) drops to zero and the voltage across the main capacitor has been discharged, then the inverter switches are disabled in step 55.

Figure 5:
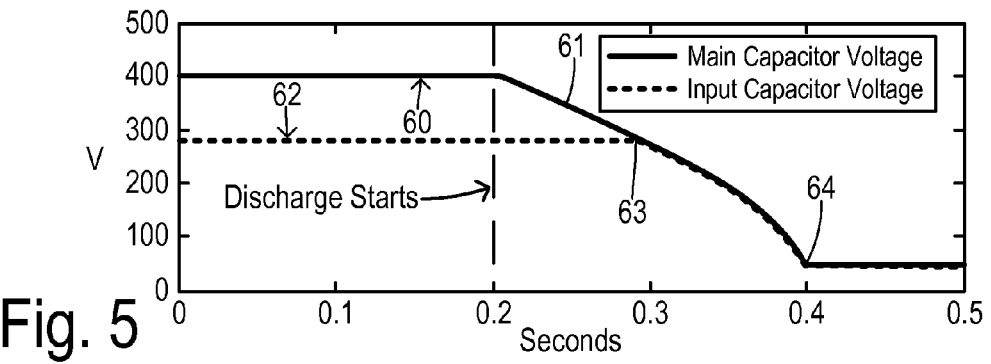
FIGS. 5 and 6 show the capacitor voltages and the inductor current, respectively, within a drive system using a conventional discharge method.
Figure 6:
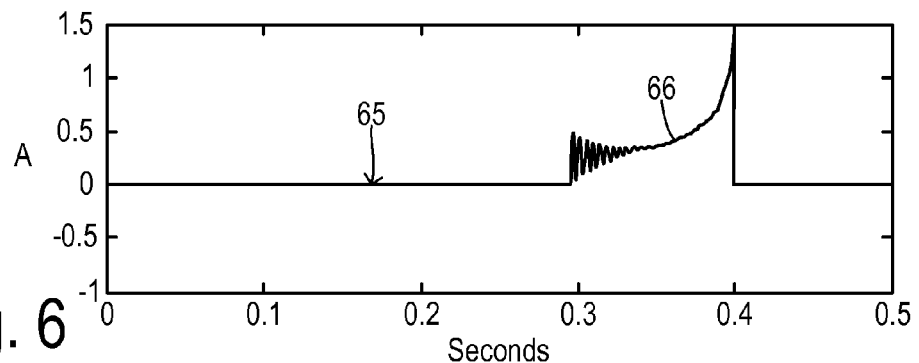

A comparison of the typical performance of the present invention with that of the conventional method is shown in FIGS. 5-8. FIG. 5 shows a discharge using the conventional method, wherein a curve 60 is the main capacitor voltage and a curve 62 is the input capacitor voltage. The main capacitor voltage starts out at a nominal value of 400 V. When discharge starts, the main capacitor voltage begins to decay along a trace 61. After a delay, the main capacitor voltage has decreased to a level equal to an initial value of the input capacitor voltage. The input capacitor voltage maintains its original level until the voltages are equal at a point 63. Thereafter, both capacitors discharge at an equal rate until reaching a safe threshold voltage at a point 64. After the start of discharging, it requires 200 ms in order for the input capacitor voltage to drop to the safe threshold. FIG. 6 shows a curve 65 representing the current flowing from the input capacitor which is initially zero and ramps upward at 66 during the discharge phase of the input capacitor.

Figure 7:
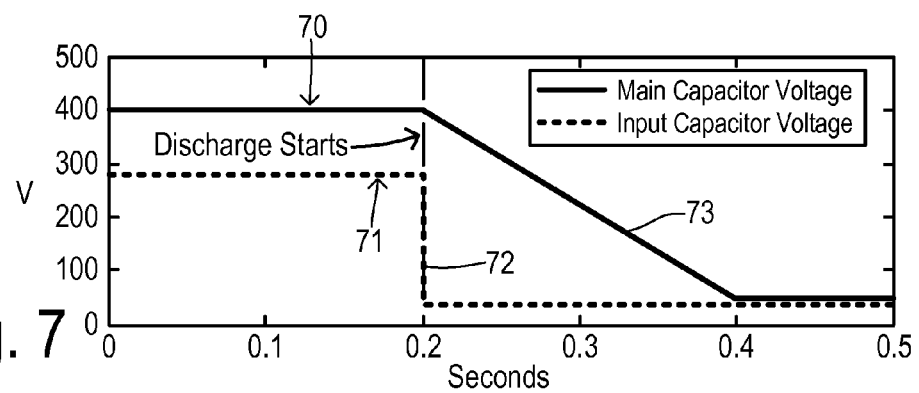
FIGS. 7 and 8 show the capacitor voltages and the inductor current, respectively, within a drive system using a discharge method according to the present invention.
Figure 8:
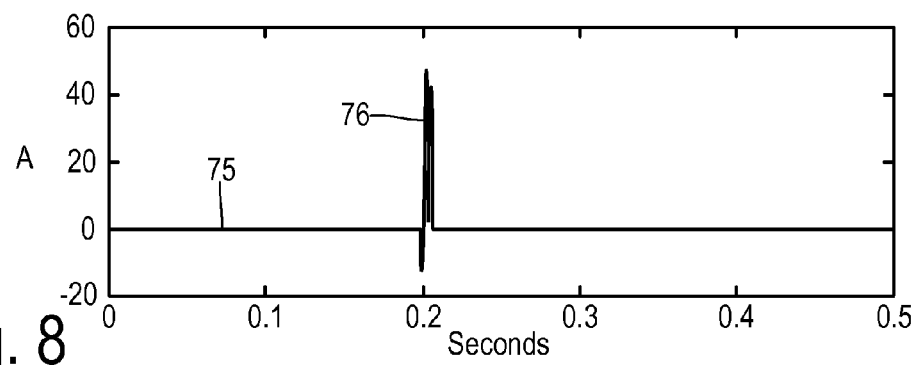

In contrast, FIG. 7 shows results obtained using the present invention, wherein a curve 70 plots the main capacitor voltage and curve 71 plots the input capacitor voltage. As soon as the discharging starts, the input capacitor voltage begins to drops along line segment 72. Within about 2 ms, the input capacitor voltage drops below the safe voltage threshold. The main capacitor voltage discharges along line segment 73, requiring about as much time as was required for the conventional method. However, the input capacitor has already been fully discharged throughout this time, and the high-voltage on the main capacitor becomes isolated from the external environment. FIG. 8 shows a plot of the input capacitor current 75 which achieves a high value at 76 during the boost mode in order to quickly transfer all the charge off the input capacitor.

As a result of the improved discharge strategy of the present invention, the input capacitor can be discharged much faster than previously possible. Furthermore, the input capacitor voltage can be quickly discharged at any motor or generator speed. Furthermore, the present invention optionally uses a closed loop control for the main capacitor voltage discharge which is robust against motor or generator position sensor inaccuracies.

What is claimed is:

1. A drive system for an electric vehicle, comprising:
   an input capacitor;
   a contactor with an open state and a closed state for selectably coupling the input capacitor to a DC power source;
   a main capacitor;
   a variable voltage converter coupling the input capacitor to the main capacitor, the converter comprising a plurality of converter switches adapted for boost conversion;
   an inverter for coupling the main capacitor to a machine load, the inverter comprising a plurality of inverter switching devices in a bridge configuration;
   a controller coupled to the converter and the inverter to discharge the input capacitor and the main capacitor when the contactor goes from the closed state to the open state by A) operating the converter in the boost mode to transfer charge from the input capacitor to the main capacitor until the input capacitor discharges to less than a threshold voltage, B) deactivating the converter switches to prevent transferring charge from the main capacitor to the input capacitor, and C) discharging the main capacitor through the inverter switches.

2. The drive system of claim 1 wherein the variable voltage converter operates with a duty cycle that ramps down during discharge of the input capacitor.

3. The drive system of claim 1 wherein the inverter is controlled in an active bus-voltage regulation mode during discharge of the input capacitor to prevent overshoot of a voltage across the main capacitor.

4. The drive system of claim 1 wherein the variable voltage converter includes an inductor coupled from the input capacitor to a junction between the converter switching devices, and wherein the converter switching devices are coupled in series across the main capacitor.

5. The drive system of claim 1 wherein the machine load is comprised of a traction motor.

6. The drive system of claim 1 wherein the machine load is comprised of a generator.

7. A method to shut down a drive system of an electric vehicle, comprising the steps of:
   opening a contactor between a DC power source and an input capacitor of the drive system;
   operating a variable voltage converter in a boost mode between the input capacitor and a main capacitor of the drive system to transfer charge from the input capacitor to the main capacitor;
   deactivating the converter when the input capacitor discharges to less than a threshold voltage;
   activating inverter switches coupled between the main capacitor and a machine load to discharge the main capacitor to a predetermined voltage by dissipating the charge on the main capacitor into the machine load.

8. The method of claim 7 wherein the step of operating the variable voltage converter in a boost mode is comprised of ramping down a duty cycle at which the variable voltage converter is switched during discharge of the input capacitor.

9. The method of claim 7 further comprising the step of:
   controlling the inverter switches in an active bus-voltage regulation mode during discharge of the input capacitor to prevent overshoot of a voltage across the main capacitor.

10. A method of discharging capacitors in an electric vehicle drive system, comprising:
    operating a variable voltage converter in a boost mode to transfer charge from an input capacitor to a main linking capacitor in response to disconnection of a DC power source to the input capacitor;

deactivating the converter when the input capacitor discharges to less than a threshold voltage; and operating an inverter to discharge the main linking capacitor into a machine load.

11. The method of claim 10 wherein the step of operating the variable voltage converter in a boost mode is comprised of ramping down a duty cycle at which the variable voltage converter is switched during discharge of the input capacitor.

12. The method of claim 10 further comprising the step of:

controlling the inverter in an active bus-voltage regulation mode during discharge of the input capacitor to prevent overshoot of a voltage across the main linking capacitor.

13. The method of claim 10 wherein the step of operating the inverter to discharge the main linking capacitor begins substantially simultaneously with the step of operating the variable voltage converter in a boost mode.

14. The method of claim 10 wherein the step of operating the inverter to discharge the main linking capacitor begins after the step of deactivating the converter.

* * * * *